United States Patent [19]
Dinc et al.

[11] Patent Number: 5,657,998
[45] Date of Patent: *Aug. 19, 1997

[54] GAS-PATH LEAKAGE SEAL FOR A GAS TURBINE

[75] Inventors: Osman Saim Dinc, Troy; Robert Harold Cromer, Johnstown; Bharat Sumpathkumar Bagepalli, Schenectady, all of N.Y.; James Robert Maynard, Greenville, S.C.

[73] Assignee: General Electric Company, Schenectady, N.Y.

[*] Notice: The term of this patent shall not extend beyond the expiration date of Pat. No. 5,509,669.

[21] Appl. No.: 572,355

[22] Filed: Dec. 14, 1995

Related U.S. Application Data

[63] Continuation of Ser. No. 308,172, Sep. 19, 1994, abandoned.

[51] Int. Cl.$^6$ ................................................. F16J 15/18
[52] U.S. Cl. ............................................ 277/230; 277/236
[58] Field of Search ..................................... 277/230, 229, 277/215, 217, 232, 233, 236; 415/139, 191; 285/336

[56] References Cited

U.S. PATENT DOCUMENTS

| | | | |
|---|---|---|---|
| 271,390 | 1/1883 | Woodruff | 277/230 |
| 625,155 | 5/1899 | Dresser | 285/336 |
| 2,194,266 | 3/1940 | Allen | 285/336 |
| 2,827,319 | 3/1958 | Pearce | 277/230 |
| 3,113,526 | 12/1963 | Paschke | 277/215 |
| 3,271,039 | 9/1966 | Kohl et al. | 277/230 |
| 3,812,316 | 5/1974 | Milburn | 277/230 |
| 3,970,318 | 7/1976 | Tuley | 277/26 |
| 4,415,309 | 11/1983 | Atterbury | 415/170 R |
| 4,465,284 | 8/1984 | Szema | 277/22 |
| 4,626,002 | 12/1986 | Hagemeister et al. | 277/230 |
| 4,645,217 | 2/1987 | Honeycutt et al. | 277/230 |
| 4,730,876 | 3/1988 | Werner et al. | 300/2 |
| 5,096,210 | 3/1992 | Wood et al. | 277/230 |
| 5,104,286 | 4/1992 | Donian | 277/230 |
| 5,221,096 | 6/1993 | Heldreth et al. | 277/227 |
| 5,240,769 | 8/1993 | Ueda et al. | 428/365 |
| 5,265,412 | 11/1993 | Bagepalli et al. | 60/39.32 |
| 5,509,669 | 4/1996 | Wolfe et al. | 277/230 |

FOREIGN PATENT DOCUMENTS

| | | | |
|---|---|---|---|
| 0135653 | 6/1988 | Japan | 277/227 |

OTHER PUBLICATIONS

See discussion in "Background of the Invention" of the present patent application.
See Attached "Applicants' Statement of Facts".

*Primary Examiner*—Scott Cummings
*Attorney, Agent, or Firm*—Douglas E. Erickson; Marvin Snyder

[57] ABSTRACT

A gas-path leakage seal for generally sealing a gas-path leakage-gap between spaced-apart first and second members of a gas turbine (such as first and second segments of a gas turbine combustor casing). The seal includes a generally imperforate foil-layer assemblage which is generally impervious to gas, is located in the leakage-gap, is spaced apart from the first member, and has a first foil layer. The seal also includes a cloth-layer assemblage contacting the first member and having a first cloth layer generally enclosing and generally enclosingly-contacting the foil-layer assemblage. The first foil layer is made from a metal, ceramic, and/or polymer. The first cloth layer is made from metal, ceramic, and/or polymer fibers. The foil assemblage provides for sealing and flexibility, and the cloth assemblage provides for wear resistance and flexibility. The seal accommodates different surface shapes, assembly misalignment, vibration, and differential thermal growth of the gas turbine members.

12 Claims, 2 Drawing Sheets

5,657,998

GAS-PATH LEAKAGE SEAL FOR A GAS TURBINE

This application is a continuation of application Ser. No. 08/308,172 filed Sep. 19, 1994, now abandoned.

BACKGROUND OF THE INVENTION

The present invention relates generally to gas turbines, and more particularly to a gas-path leakage seal for a gas turbine.

Gas turbines include, but are not limited to, gas turbine power generation equipment and gas turbine aircraft engines. A gas turbine has a gas path which typically includes, in serial-flow relationship, an air intake (or inlet), a compressor, a combustor, a turbine, and a gas outlet (or exhaust nozzle). Gas leakage, either out of the gas path or into the gas path, from an area of higher pressure to an area of lower pressure is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between gas turbine subassemblies such as through gaps between the combustor and the turbine, and gas-path leakage occurs through gaps between the components that make up a gas turbine subassembly, such as through gaps between combustor casing segments. Such components and subassemblies have surfaces of different shapes, suffer from assembly misalignment, and undergo vibration. Hot-section components thermally experience hot gas flow and typically undergo different thermal growths. Conventional seals are used to reduce such leakage. For example, a conventional rigid or leaf seal made of metal may have a leakage of 2.4% (primarily from flow around the seal due to different surface shapes, assembly misalignment, vibration, thermal growth, and/or wear). Such leakage in the combustor may result in a 15 (or much higher) parts-per-million (ppm) NOx production and a similar CO production. What is needed is an improved gas-path leakage seal for a gas turbine which will further increase efficiency and further decrease pollution, such as further decreasing NOx and CO production.

SUMMARY OF THE INVENTION

It is an object of the invention to provide a gas-path leakage seal for a gas turbine.

The gas-path leakage seal of the invention is for generally sealing a gas-path leakage-gap between spaced-apart first and second members of a gas turbine. The seal includes a generally imperforate foil-layer assemblage and a cloth-layer assemblage. The foil-layer assemblage is generally impervious to gas, is located in the leakage-gap, is spaced apart from the first member, and has a first foil layer. The cloth-layer assemblage contacts the first member and has a first cloth layer which generally encloses and generally enclosingly-contacts the foil-layer assemblage.

Several benefits and advantages are derived from the invention. The foil-layer assemblage of the seal offers good sealing and good flexibility. The cloth-layer assemblage offers some sealing, good wear resistance, and good flexibility. Good flexibility means the seal is very compliant and can accommodate surfaces of different Shapes, assembly misalignment, vibration, and differential thermal growth. Initial gas turbine combustor tests showed a gas-path leakage of generally 1.0% with the seal of the invention compared to a gas-path leakage of 2.4% with a conventional metal rigid seal. Such improved gas-path leakage showed a 6 ppm NOx production with the seal of the invention compared to a 15 ppm NOx production with the conventional seal. It is anticipated that CO production would be similarly lowered, Thus, it is expected that the seal of the invention (which can be retrofitted) will allow today's gas turbine combustors to meet future governmental pollution standards of 9 ppm NOx production and 9 ppm CO production.

BRIEF DESCRIPTION OF THE DRAWINGS

The accompanying drawings illustrate several preferred embodiments of the present invention wherein.

DETAILED DESCRIPTION OF THE INVENTION

Figure 1:
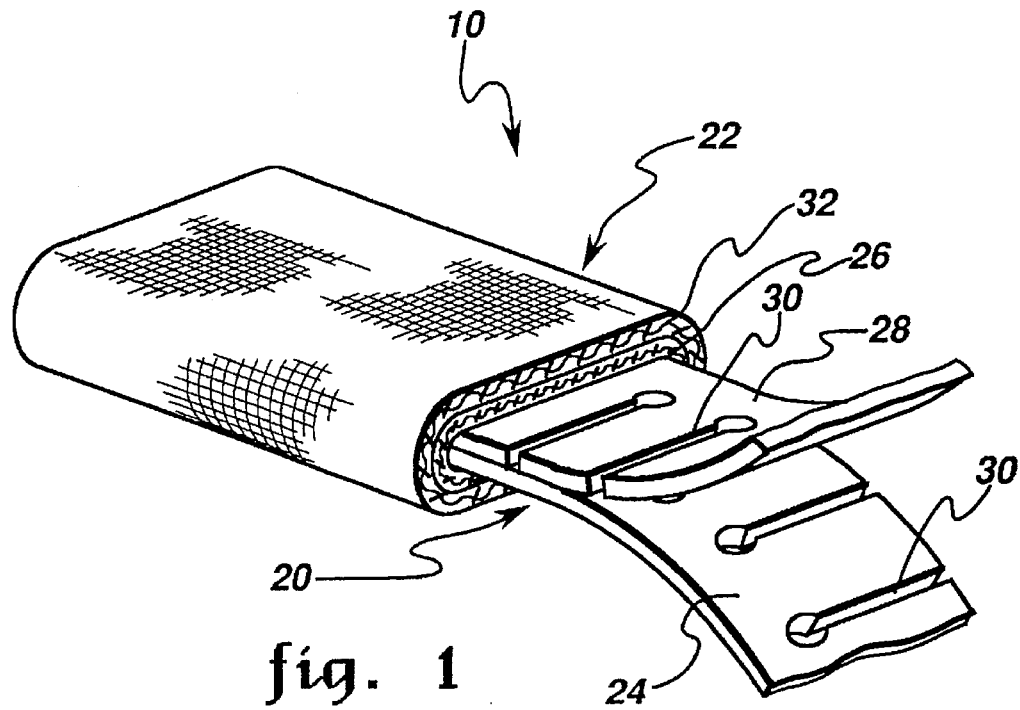
FIG. 1 is a schematic perspective view of a first preferred embodiment of the seal of the present invention with the cloth-layer assemblage removed from an end portion of the seal exposing the foil-layer assemblage and with an end portion of the two foil layers of the foil-layer assemblage shown in separation.
Figure 2:
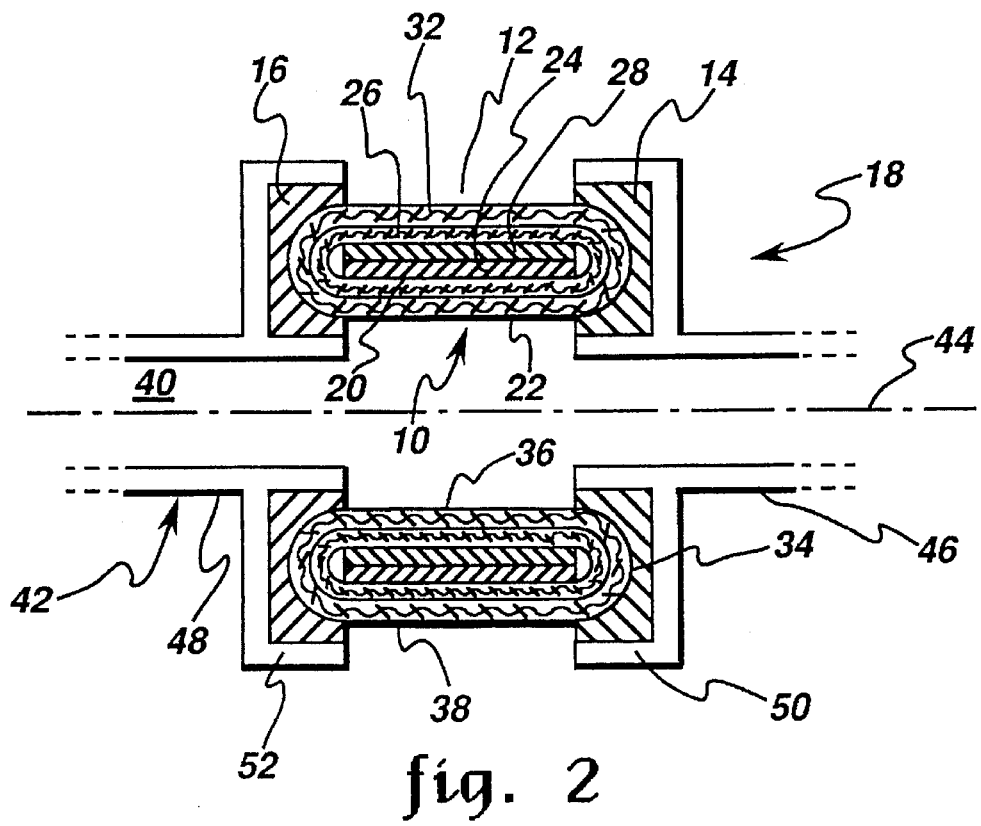
FIG. 2 is a schematic cross-sectional view of the seal of FIG. 1 shown installed in a gas-path leakage-gap between two gas turbine members.

Referring now to the drawings, wherein like numerals represent like elements throughout, FIG. 1 schematically shows a first preferred embodiment of the gas-path leakage seal 10 of the present invention, and FIG. 2 shows a preferred installation of the seal 10. The gas-path leakage seal 10 is for generally sealing a gas-path leakage-gap 12 between spaced-apart first and second members 14 and 16 of a gas turbine 18 (only a small portion of which is shown in FIG. 2). The seal 10 includes a generally imperforate foil-layer assemblage 20 and a cloth-layer assemblage 22. The foil-layer assemblage 20 is generally impervious to gas, is disposed in the gas-path leakage-gap 12, is spaced-apart from the first member 14, and has a first foil layer 24. The cloth-layer assemblage 22 contacts the first member 14 and has a first cloth layer 26 generally enclosing and generally enclosingly-contacting the foil-layer assemblage 20.

The foil-layer assemblage 20 of seal 10 is an assemblage of overlying layers of foil. The foil comprises (and preferably consists essentially of) metal, ceramic, and/or polymer foil. The choice of materials for the foil and the choice of the thickness for a layer are made by the artisan to meet the sealing and flexibility requirements of a particular seal application. Preferably, the foil-layer assemblage 20 has no more than four layers of foil. In an exemplary embodiment, as best seen in FIG. 1, the foil-layer assemblage 20 also has a second foil layer 28 which is generally identical to and generally superimposed on the first foil layer 24. In a preferred embodiment, for added flexibility, the first and second foil layers 24 and 28 each have slots 30, wherein the slots 30 of the second foil layer 28 are spaced apart from the slots 30 of the first foil layer 24 to ensure that the foil-layer assemblage 20 is generally impervious to gas. Preferably, the foil-layer assemblage 20 has a thickness of generally between five and ten thousandths of an inch, and the first and second foil layers 24 and 28 each comprise a high-temperature, cobalt-based super-alloy, such as L-605. It is noted that the first and second foil layers 24 and 28 can comprise different materials and/or have different thicknesses depending on the particular seal application.

The cloth-layer assemblage 22 of seal 10 is an assemblage of overlying layers of cloth. A cloth layer comprises (and preferably consists essentially of) metal, ceramic, and/or polymer fibers which have been woven, knitted, or pressed into a layer of fabric. The choice of layer construction (i.e., woven, knitted, or pressed), the choice of materials for the cloth, and the choice of the thickness for a layer are made by the artisan to meet the wear resistance, flexibility, and sealing requirements of a particular seal application. Preferably, the cloth-layer assemblage 22 has no more than two layers of cloth. In an exemplary embodiment, as best seen in FIG. 1, the cloth-layer assemblage 22 also has a second cloth layer 32 generally enclosing and generally enclosingly-contacting the first cloth layer 26 of the cloth-layer assemblage 22. Preferably, the cloth-layer assemblage 22 has a thickness of generally between ten and twenty-five thousandths of an inch, and the first and second cloth layers 26 and 32 each are woven cloth layers and each comprise a high-temperature, nickel-based super-alloy, such as Inconel X-750. It is noted that the first and second cloth layers 26 and 32 can comprise different materials, different layer construction (i.e., woven, knitted, or pressed) and/or have different thicknesses depending on the particular seal application.

For purposes of describing the invention, the terminology "first and second members 14 and 16 of a gas turbine 18" includes the hardware used to attach the seal to the other portions of the gas turbine 18. Such hardware includes, but is not limited to, brackets, "U"-shaped flanges, extension arms, and backing plates.

In the preferred installation of seal 10, seen in FIG. 2, the first and second members 14 and 16 of the gas turbine 18 each are seen as a generally "U"-shaped bracket (with hatching lines shown for clarity) which holds the cloth-layer assemblage 22 by either spot-welding or by compressive fit, with the cloth-layer assemblage 22 generally enclosing and generally enclosingly-contacting the foil-layer assemblage 20 (shown with hatching lines for clarity) by a stretch fit. From FIG. 2 it is seen that the cloth-layer assemblage 22 includes an edge 34 and two generally opposing outer surfaces 36 and 38 joined at the edge 34, and it is seen that the edge 34 of the cloth-layer assemblage 22 contacts the first member 14 of the gas turbine 18. Preferably, the first and second members 14 and 16 are members of a gas turbine combustor 40.

In an exemplary embodiment, the first and second members 14 and 16 are members of a gas turbine combustor casing 42. The gas turbine combustor casing 42 has a generally longitudinally extending axis 44 and generally annular first and second segments 46 and 48 which are each generally coaxially aligned with the axis 44. The first segment 46 terminates in a generally "U"-shaped first flange 50 and includes the first member (bracket) 14 which is disposed in, and typically is spot-welded to, the first flange 50. Likewise, the second segment 48 terminates in a generally "U"-shaped second flange 52 and includes the second member (bracket) 16 which is disposed in, and typically is spot-welded to, the second flange 52. In the preferred installation of the seal 10, seen in FIG. 2, the foil-layer assemblage 20 is spaced-apart from the second member (bracket) 16, and the cloth-layer assemblage 22 contacts the second member (bracket) 16. It is noted that, in general, the cloth-layer assemblage 22 can generally enclose the foil-layer assemblage 20 without covering the ends (not seen in cross-sectional FIG. 2) and/or the edges (shown as covered right and left edges in FIG. 2 which are unnumbered for clarity) of the foil-layer assemblage 20. It is further noted that the foil-layer assemblage 20 can be secured within the cloth-layer assemblage 22 by any suitable securing technique, and that the cloth-layer assemblage 22 can be attached to the first and/or second member 14 and/or 16 of the gas turbine 18 by any suitable attachment.

Figure 3:
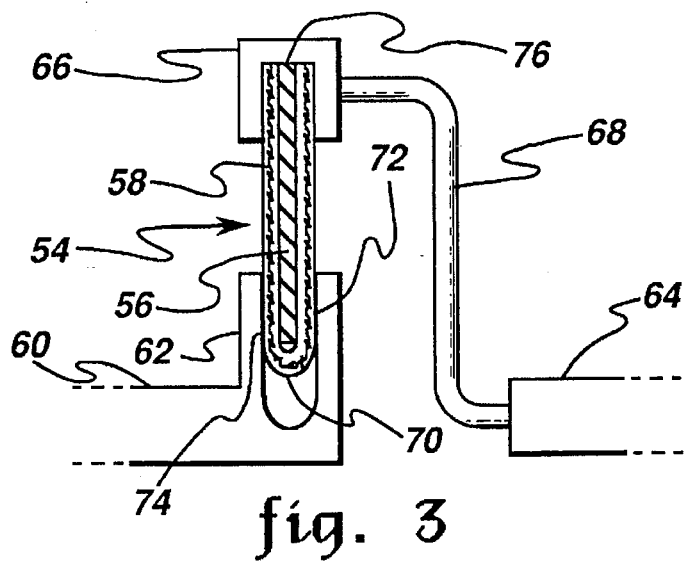
FIG. 3 is a schematic cross-sectional view of a seal installation for a second preferred embodiment of the seal of the invention.
Figure 4:
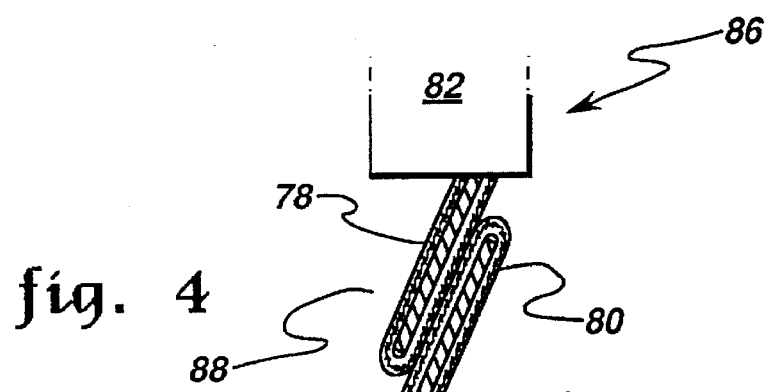
FIG. 4 is a schematic cross-sectional view of a twin-seal installation wherein each seal is generally identical to the seal of FIG. 3.
Figure 5:
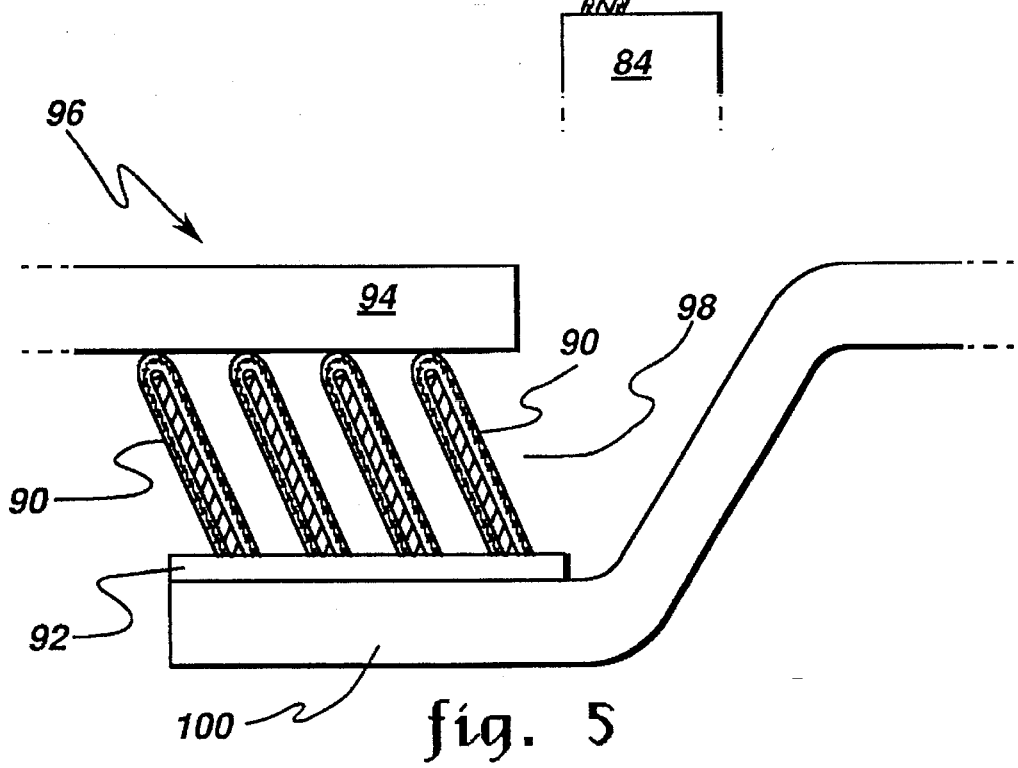
FIG. 5 is a schematic cross-sectional view of a multi-seal installation wherein each seal is generally identical to the seal of FIG. 3.

Referring again to the drawings, FIGS. 3–5 schematically show a second preferred embodiment of the gas-path leakage seal 54 which includes a single foil layer 56 and a single cloth layer 58.

FIG. 3 shows an installation of the seal 54. A first gas turbine subassembly, such as a combustor, includes a combustor casing 60 which terminates in a first member which is a generally "U"-shaped flange 62. A second gas turbine subassembly, such as a turbine, includes a nozzle casing 64, a second member which is a generally "U"-shaped bracket 66, and an extension arm 68 connecting the bracket 66 to the nozzle casing 64. The seal 54 is fixedly attached to the bracket (second member) 66 and, under vibration and/or differential thermal growth, is in slidingly contact with (i.e., slidingly engages) the flange (first member) 62. It is noted that this installation is suitable for seal applications requiring a relatively large leakage gap and a relatively small part overlap, as can be appreciated by those skilled in the art. Also, in this installation, it is seen that the cloth-layer assemblage (here consisting of the single cloth layer 58) includes an edge 70 and two generally opposing outer surfaces 72 and 74 joined at the edge 70, and that the outer surfaces 72 and 74 of the cloth-layer assemblage (here consisting of the single cloth layer 58) contact the flange (first member) 62 proximate the edge 70 of the cloth-layer assemblage (here consisting of the single cloth layer 58). It is pointed out that seal 54 is generally identical to seal 10 with the exception that seal 54 has a single (instead of a double) foil layer 56 and a single (instead of a double) cloth layer 58 and with the exception that seal 54 has its cloth-layer assemblage (here consisting of a single cloth layer 58) not enclose one of the edges of its foil-layer assemblage (here consisting of one of the edges 76 of its single foil layer 56).

FIG. 4 shows a twin-seal installation wherein each of the seals 78 and 80 is generally identical to the seal 54 of FIG. 3 with the seals 78 and 80 having a different seal installation from that shown in FIG. 3. First and second members 82 and 84 of a gas turbine 86 (only a small portion of which is shown in FIG. 4) are spaced apart creating a gas-path leakage-gap 88 therebetween. Seal 78 is attached to the first member 82 and extends towards, but does not contact, the second member 84. Likewise, seal 80 is attached to the second member 84 and extends towards, but does not contact, the first member 82. The seals 78 and 80 have portions which overlap and are "preloaded" such that their overlapping portions compressively contact each other to generally seal the leakage-gap 88.

FIG. 5 shows a multi-seal installation wherein each of the seals 90 is generally identical to the seal 54 of FIG. 3 with the seals 90 having a different seal installation from that shown in FIG. 3. First and second members 92 and 94 of a gas turbine 96 (only a small portion of which is shown in FIG. 5) are spaced apart creating a gas-path leakage-gap 98 therebetween. Each of the seals 90 is attached to the first member 92 which is a backing plate. The first member (backing plate) 92 is attached to another member 100 of the gas turbine 96. The seals 90 extend towards and compressively contact the second member 94 to generally seal the leakage-gap 98. It is noted that this installation is suitable for seal applications requiring a relatively small leakage gap and a relatively large part overlap, as can be appreciated by those skilled in the art.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A gas-path leakage seal for generally sealing a gas-path leakage-gap between spaced-apart first and second members of a gas turbine, said seal comprising:

a) a generally imperforate foil-layer assemblage consisting essentially of material selected from the group consisting of metals, ceramics, and polymers, generally impervious to gas, disposed in said gas-path leakage-gap, spaced apart from said first member, having a foil-assemblage edge and generally opposing first and second foil-assemblage outer surfaces extending to said foil-assemblage edge, and having a first foil layer wherein said first foil layer has a lengthwise direction and wherein a cross section of said first foil layer normal to said lengthwise direction does not itself completely enclose other structure; and b) a woven, non-impregnated, cloth-layer assemblage generally pervious to gas, contacting said first member, and having a first cloth layer covering and contacting generally the entire first foil-assemblage outer surface, and covering and contacting generally the entire second foil-assemblage outer surface, wherein said foil-layer assemblage consists essentially of material selected from the group consisting of metals, ceramics, and polymers, and wherein said first cloth layer covers generally the entire foil-assembly edge.

2. The seal of claim 1, wherein said cloth-layer assemblage includes a cloth-assemblage edge and two generally opposing cloth-assemblage outer surfaces joined at said cloth-assemblage edge, and wherein said two generally opposing cloth-assemblage outer surfaces contact said first member proximate said cloth-assemblage edge.

3. The seal of claim 1, wherein said cloth-layer assemblage includes a cloth-assemblage edge and two generally opposing cloth-assemblage outer surfaces joined at said cloth-assemblage edge, and wherein said cloth-assemblage edge contacts said first member.

4. The seal of claim 1, wherein said foil-layer assemblage is spaced apart from said second member, and wherein said cloth-layer assemblage contacts said second member.

5. The seal of claim 1, wherein said cloth-layer assemblage includes a second cloth layer generally enclosing and generally enclosingly-contacting said first cloth layer of said cloth-layer assemblage.

6. The seal of claim 1, wherein said foil-layer assemblage includes a second foil layer which is generally identical to and generally superimposed on and generally entirely contacts said first foil layer.

7. The seal of claim 6, wherein said first and second foil layers each have slots, wherein said slots of said second foil layer are spaced apart from said slots of said first foil layer.

8. The seal of claim 1, wherein said first and second member are members of a gas turbine combustor.

9. The seal of claim 8, wherein said first and second members are members of a gas turbine combustor casing.

10. The seal of claim 1, wherein said foil-layer assemblage consists essentially of metal.

11. The seal of claim 1, wherein said foil-layer assemblage has a thickness of generally between five and ten thousandths of an inch.

12. The seal of claim 11, wherein said cloth-layer assemblage has a thickness of generally between ten and twenty-five thousandths of an inch.

* * * * *